(12) United States Patent
Mandava

(10) Patent No.: US 9,760,725 B2
(45) Date of Patent: Sep. 12, 2017

(54) CONTENT TRANSFER CONTROL

(75) Inventor: Srikanth Mandava, Andhra (IN)

(73) Assignee: CA, Inc., Islandia, NY (US)

( * ) Notice: Subject to any disclaimer, the term of this patent is extended or adjusted under 35 U.S.C. 154(b) by 966 days.

(21) Appl. No.: 12/137,044

(22) Filed: Jun. 11, 2008

(65) Prior Publication Data

US 2009/0313702 A1 Dec. 17, 2009

(51) Int. Cl.
- G06F 7/04 (2006.01)
- G06F 17/30 (2006.01)
- H04N 7/16 (2011.01)
- G06F 21/62 (2013.01)

(52) U.S. Cl.
CPC .... G06F 21/6218 (2013.01); G06F 17/30115 (2013.01)

(58) Field of Classification Search
CPC .. G06F 21/6218; G06F 21/6245; G06F 21/10; G06F 21/6209; H04L 63/10
USPC .......................................................... 726/27
See application file for complete search history.

(56) References Cited

U.S. PATENT DOCUMENTS

2002/0082997 A1* 6/2002 Kobata et al. ................... 705/51
2006/0274154 A1* 12/2006 Levien et al. ............. 348/207.1

* cited by examiner

Primary Examiner — Dant Shaifer Harriman
Assistant Examiner — Stephen Sanders
(74) Attorney, Agent, or Firm — Gilliam IP PLLC (57) ABSTRACT

Some embodiments provide one or more of systems, methods, software, and data structures to control locations where files may be stored. Some such embodiments include receiving a request to perform a file management function affecting a location where a first file is stored and querying a repository of file management rules as a function of at least one of a file type of the first file, a location where the first file is stored, a destination of where the first file is to be stored, and an identity of a user to retrieve a first set of file management rules. These embodiments further include determining if the destination is an authorized location where the first file may be stored as a function of the first set of retrieved file management rules and preventing the file management function when the determining identifies that the destination is not an authorized location.

14 Claims, 5 Drawing Sheets

CONTENT TRANSFER CONTROL

BACKGROUND INFORMATION

A user who having files stored within a computer system has the ability to copy those files in and out of the computer system as long as the user has read access on the source and write access on the destination. However, there are situations where content is accessible to the user but is not intended for broader distribution to other users, such as by copying of the content file to locations accessible to the other users.

SUMMARY

In various embodiments, a computerized method for content transfer control includes receiving a request to perform a file management function affecting a location where a first file is stored and querying a repository of file management rules to retrieve a set of file management rules. The method further includes determining if the destination is an authorized location where the first tile may be stored as a function of the retrieved file management rules and preventing the file management function when the determining identifies that the destination is not an authorized location.

Other embodiments provide a system including a processor and memory coupled to a bus and a file management policy module stored in the memory and executable by the processor. In such embodiments, the file management policy module is executable by the processor to receive a file management request affecting a location where a file is stored. The file management module may then query a repository of file management rules as a function of at least one of a file type of the file, a location where the file is stored, a destination of where the file is to be stored, and an identity of a user of the system. The system may then determine if the file may be stored at the destination as a function of the query results and prevent the file management function when the determining identifies that the file may not be stored at the destination.

DETAILED DESCRIPTION

Various embodiments described herein with reference to the figures include one or more of systems, methods, software, and data structures that provide for file storage destination control. Some embodiments include policies defining what type of content may be copied, moved, stored, and deleted to and from various storage locations, which may be local to a client or at a remote network location. In some embodiments, when a user requests an action that will affect where a file is stored, the action is evaluated before execution to ensure the file may be stored in the requested location. Storing of the file in the requested location may be limited by one or more of, or a combination of, the type of file, an original storage location of the file, a destination storage location for the file, the type of file, or other properties of or associated with the file.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
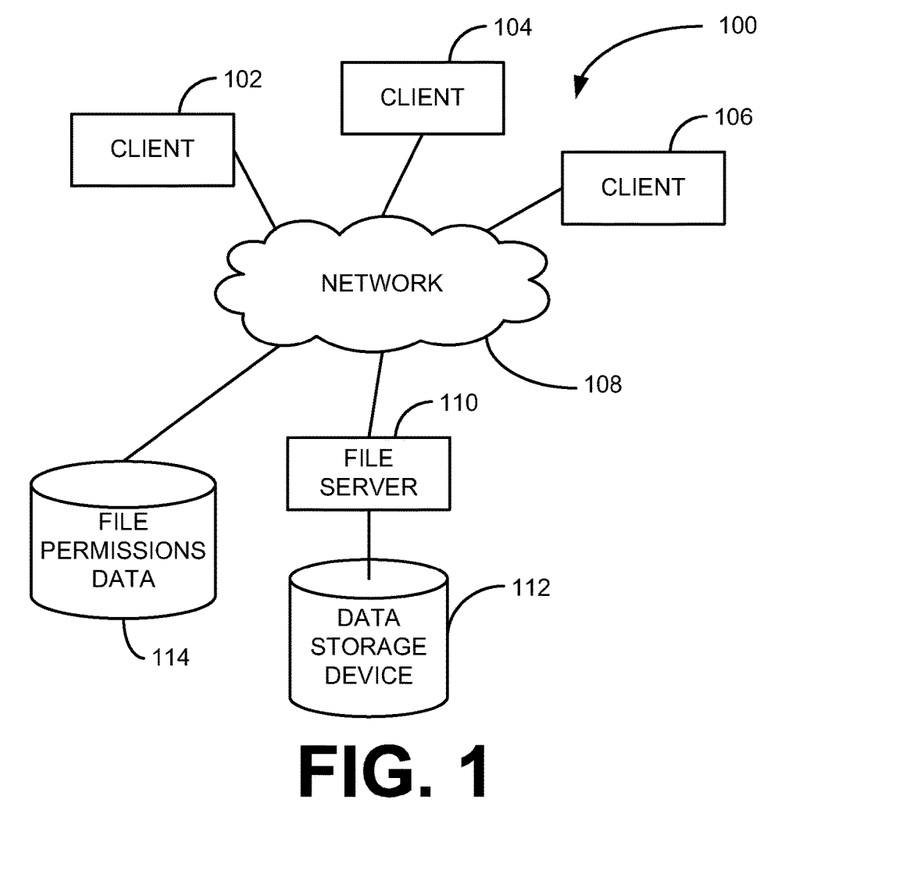
FIG. 1 is a block diagram of a network system according to an example embodiment.

FIG. 1 is a block diagram of a network system 100 according to an example embodiment. The network system 100 includes clients 102, 104, 106 connected to a network 108. Also connected to the network 108 is a file server 110 that includes, or is connected to, and controls access to a data storage device 112. The network system 100 may also include file permissions data 114 stored in a database, as is illustrated. However, the file permissions data 114 may also, or alternatively, be stored in the data storage device 112. In some other embodiments, the file permissions data may be stored locally on one or more of the clients 102, 104, 106.

In some embodiments, the file server 110 is a conduit for access to files stored on the data storage device 112. The files stored on the data storage device 112 may be of virtually any type of file, such as word processing document files, spreadsheets, audio/video files, flat files of data, database files, and others. File management functions that may be performed with or against these files stored on the data storage device may be limited by file management policies represented in the file permissions data 114.

The file management policies represented in the file permissions data 114 may be used to limit files that may be stored on or copied from the data storage device 112. The file management policies may also limit files that may be stored on, copied, read by, or otherwise accessed from the clients 102, 104, 106, or at other data storage locations. Such other data storage locations may be accessible over the network 108 or locally to the clients 102, 104, 106, the file server 110, or other device that may be connected to the network 108. These other data storage locations may include external data storage devices such as Universal Serial Bus (USB) drives, writable diskettes, particular hard disks, memories, and other data storage devices.

An example file management policy represented in the file permissions data may identify a data storage location, such as the data storage device 112, and define a policy that allows files to be read from the data storage device 112 but prevents those files from being written, or otherwise stored, to other data storage locations. In some such embodiments, when client 102 requests a file from the file server 110 that is stored on the data storage device, a process on the file server 110 may query the file permissions data 114 to retrieve any applicable file management policies. The file permissions data 114 may be queried by one or more of an identity of a user of the client 102, a type of the file requested, the location from which the file is requested, a location to which the file is to be retrieved to, and other data depending on the particular embodiment. In this instance, the file server 110 may retrieve a null dataset of file management policies and in turn provide the requested file to the client 102 over the network. The file may then be presented to the user of the client 102. However, if the user of the client 102 attempts to save the file to another data storage device, such as a local hard disk or USB drive, a process on the client 102, before causing the file to be stored at the intended location, queries the file permissions data 114 to retrieve file management policies that may prevent the file from being stored at the intended location. The result set of the query by the client 102 process includes a file management policy that prevents the file from being stored at the intended location. The process of the client 102 implements this policy and may display a message to the user indicating that the file will not be stored as requested or the attempt to save the file may simply be ignored. File management policies may be applicable not only to files accessible over a network, but also accessible on a local client.

The process of the client 102 that retrieves and implements the file management policy may be a device driver, such as a device driver of a data storage device, network adapter, or network interface. However, in other embodiments, an operating system of the client 102 may be augmented with a file storage destination control module. Such a file storage destination control module may be configured to capture certain file management interrupts from the operating system. If a file management policy prevents the requested file management action, the interrupt is not released and a message may be presented to the user identifying the error occurrence. However, if there is not a policy that prevents the requested file management action, the interrupt may be released to the operating system for the file management action to be performed.

In another embodiment, the file server 110 may receive a file copy request from one of the clients, such as client 104. The file copy request may identify the client 104 user, which may be a logical user or a human user, the file to be copied, a source location of the file, such as the data storage device 112, and a destination location for the file to be copied to, such as a writable optical disk drive of the client 104. The file server 110 will retrieve file management policies represented in the file permissions data 114, which may include a policy that allows only the particular user of the client 104 to copy the file. In such instances, the file copy will be allowed. However, if the retrieved policies include a policy that prevents copying files of the type requested, such as an MP3 audio file, an error may be returned to the client 104 from the file server 110 with a message detailing the error.

In further embodiments, the file server 110 may receive a file save request to save a file on the data storage device 112. The request to save the file may include various data elements such as data identifying an author of the file, the identity of a user requesting the file be saved, a source client, such as client 106, a destination location where the file is to be stored, a size of the file, and other data pertaining to the file, the source of the file, and the destination for the file. The file server 110 may retrieve file management policies from the file permissions data 114 and apply the retrieved file management policies to determine if the file may be stored on the data storage device.

The file management policy functionality on the file server 110 may be implemented in any number of ways. In some embodiments, device drivers of data storage devices may be implemented to include this functionality. In other embodiments, file management services may be offered by the file server 110 over the network, such as web services. Further embodiments may include modifications to an operating system of the file server 110 to capture file management interrupts, which causes a file storage destination control module on the file server 110 to evaluate file management requests that affect locations where files are stored.

Figure 2:
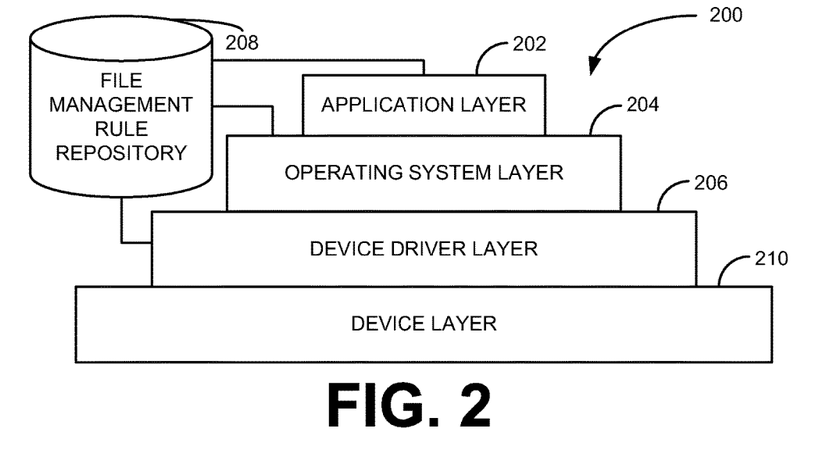
FIG. 2 is a logical block diagram of a system architecture according to an example embodiment.

FIG. 2 is a logical block diagram of a system 200 architecture according to an example embodiment. The system 200 may be a client, such as one or more of clients 102, 104, 106 of FIG. 1, or a server, such as file server 110 also of FIG. 1. The system 200 includes a device layer 210, which is representative of devices that may be used in the system 200 to store data. Access to the devices of the device layer 210 is provided through a device driver layer 206. The device driver layer 206 typically virtualizes access to the devices of the device layer 210 for an operating system of an operating system layer 204. Because of the virtualized access to the devices of the device layer 210, the operating system layer 204 may provide each application in an application layer 202 access to the devices in the device layer 210.

In some embodiments, file management functions may be performed in the application layer 202. In such embodiments, when a file management request is received, applications in the application layer 202 may be configured to query a file management rule repository 208 to retrieve applicable file management policies. The application in the application layer 202 will then apply retrieved policies and either allow or prevent execution of the file management request.

In other embodiments, the operating system layer 204 may be configured to implement file management policies held in the file management rule repository 208. Such a configuration may cause file management functions that affect locations where files are stored to be redirected to a code module, which will retrieve data from the file management rule repository 208. The retrieved data may then be processed according to the code module to determine if the file management function is allowed. Such configuration changes may be made through modifications of operating system configuration settings. In other embodiments, the operating system layer 204 may include an operating system that operates on top of a virtual machine manager. In such embodiments, the virtual machine manager may further virtualize access to the device layer 210 and other system 200 resources. In such embodiments, the virtual machine manager applies the file management policies held in the file management rule repository 208.

Figure 3:
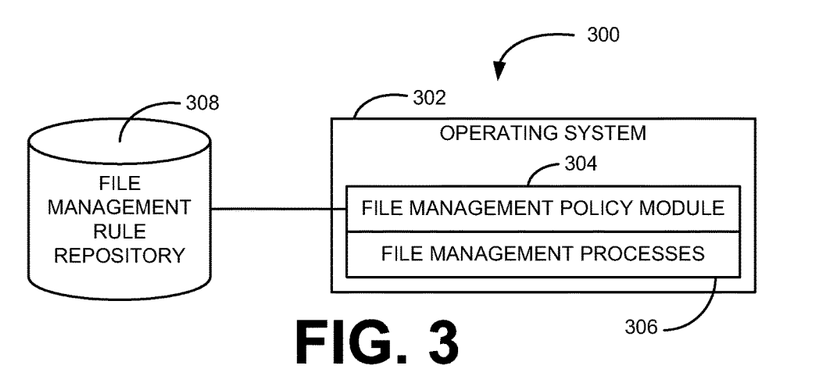
FIG. 3 is a logical block diagram of a system according to an example embodiment.

FIG. 3 is a logical block diagram of a system 300 according to an example embodiment. The system 300 includes a file management rule repository 308 that holds data defining file management policies. The system 300 further includes an operating system 302. The operating system 302 includes a file management policy module 304 and file management processes 306. The file management processes 306 represent the native file management processes 306 of the operating system 302.

When implemented, the file management policy module 304 is configured to receive file management requests. This configuration may be accomplished by modification of configuration settings of the operating system 302 or other portion of the operating system 302. This configuration is made to cause file management function requests to flow to the file management policy module 304 prior to completion of the file management functions. In one embodiment, a file management function request is received by the operating system 302 and is directed to the file management policy module 304. The file management policy module 304 may receive data with the file management function request identifying various properties of the requested file management function. This data may include data identifying the request user, a source of the file, a destination for the file, and a type of the file to be affected by the requested file management function. The file management policy module may then use some or all of that data to query the file management rule repository to obtain and apply further data to the requested file management function to determine if the file management function is allowed. If allowed, the file management policy module 304 allows the requested file management function to flow to the file management processes 306.

In some embodiments, the file management policy module 304 may be implemented using one or more of the Virtual Disk Service and the Kernel Transaction Manager available within Win32 Microsoft Windows environments to virtualize storage device access and to initiate transactions, verify the file management functions are allowed, and either perform and commit transactions or roll transactions back. The Distributed Transaction Controller of the Win32 environment may also be used in some embodiments to coordinate and ensure consistency within file management transactions being performed on more than one computer. These and other embodiments may use further elements of the Microsoft Windows operating system environment or similar elements available in other operating systems.

Figure 4:
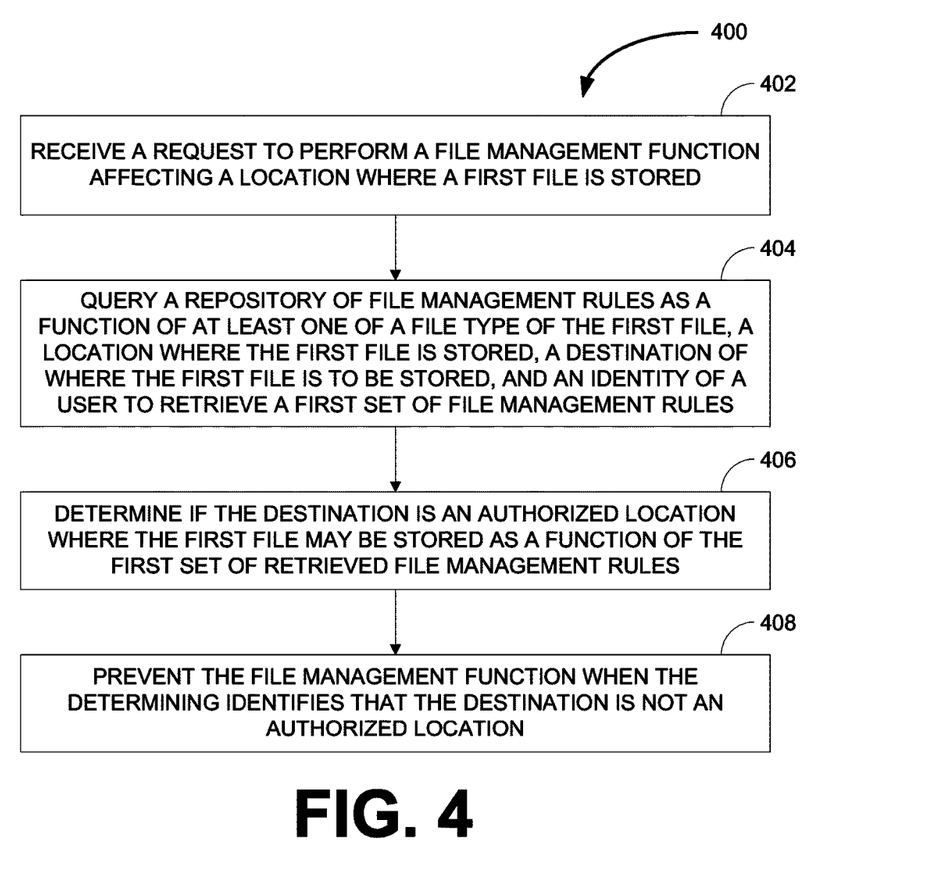
FIG. 4 is a block flow diagram of a method according to an example embodiment.

FIG. 4 is a block flow diagram of a method 400 according to an example embodiment. The method 400 is a method of monitoring and controlling performance of file management functions, such as reading, writing, copying, moving, "save as," and deleting electronic files. The method 400 includes receiving 402 a request to perform a file management function affecting a location where a first file is stored. The method 400 further includes querying 404 a repository of file management rules as a function of at least one of a file type of the first file, a location where the first file is stored, a destination of where the first file is to be stored, and an identity of a user to retrieve a first set of file management rules. The method 400 then uses the data returned by the querying 404 to determine 406 if the destination is an authorized location where the first file may be stored. If it is determined that the file management function may not be performed because the destination is not an authorized location, the method 400 includes preventing 408 the file management function.

Some embodiments of the method 400 further include logging the received 402 file management function request including an indication if the file management function was allowed or prevented and data identifying the identity of the user. These and other embodiments also include communicating an alert to another user, such as an administrator or a manager of the user requesting the file management function when the file management function is prevented.

If the querying 404 provides a null result set, the null result set indicates that there are no file management rules restricting where the first file may be stored. In such instances, the file management function is allowed.

Some embodiments of the method 400 may further determine a type of the first file. This determination may simply include looking at an extension of a file name. However, it is possible that the extension of a file is modified. Thus, in some embodiments, the method 400 may evaluate a portion of data within the file to determine if the file data matches the file type identified by the file extension or to attempt to identify the file type. This may include evaluating certain data elements in the file, such as file header or trailer data, a structure of the file, or other data in the file, which may be matched to a file format definition.

Figure 5:
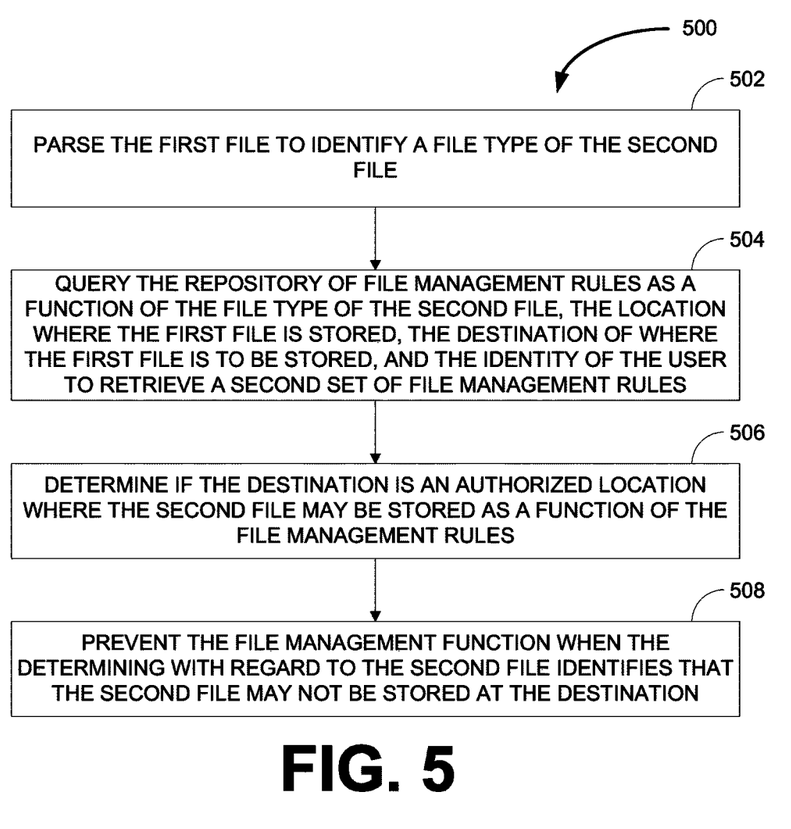
FIG. 5 is a block flow diagram of a method according to an example embodiment.

FIG. 5 is a block flow diagram of a method 500 according to an example embodiment. The method 500 may be performed in some embodiments in conjunction with the method 400 of FIG. 4. The method 500 however is directed to identifying a file type of second file embedded within a first file that may be evaluated according to the method 400. An example of an embedded file is a file compressed within a compressed file archive, such as a ZIP archive. However, in some instances, the file may be a file folder including one or more file stored therein.

The method 500 includes parsing 502 the first file, such as the file processed according to the method 400 of FIG. 4, to identify a file type of a second file embedded within the first file. The method 500 then queries 504 the repository of file management rules as a function of the file type of the second file, the location where the first file is stored, the destination of where the first file is to be stored, and the identity of the user to retrieve a second set of file management rules. Similar to the method 400, the method 500 includes determining 506 if the destination is an authorized location where the second file may be stored as a function of the file management rules. If the determining 506 identifies one or more file management rules that indicate the file management function requested with regard to the second file is not authorized, the method 500 includes preventing 508 the file management function. In such embodiments, the file management function may have been requested with regard to the first file, which may not be a limited file management function based on the first file itself. However, the first file includes the second file, which is prevented by a file management rule from being stored at the location where the first file it to be stored.

Figure 6:
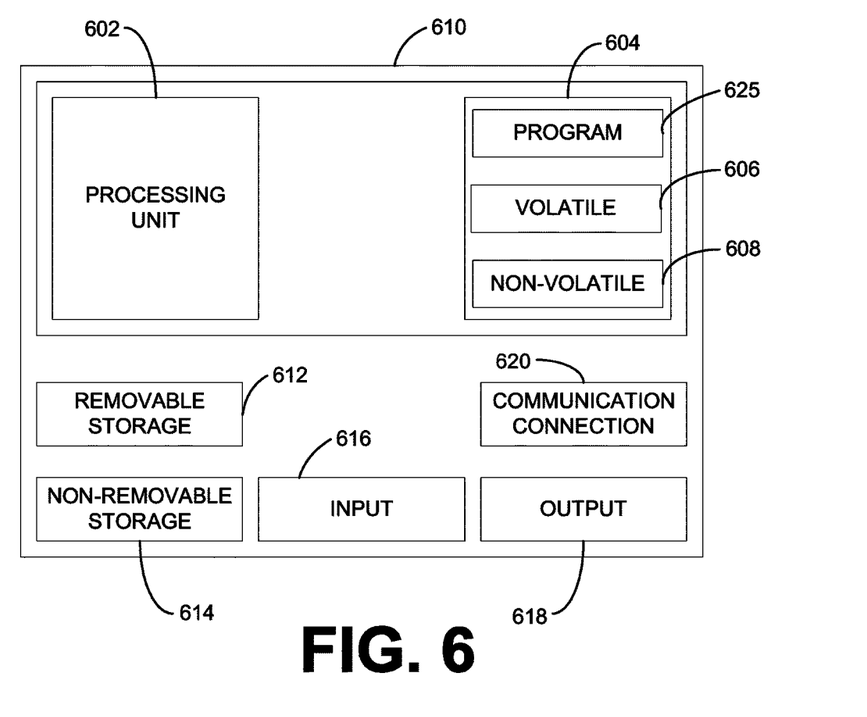
FIG. 6 is a block diagram of a computing device according to an example embodiment.

FIG. 6 is a block diagram of a computing device according to an example embodiment. In one embodiment, multiple such computer systems are utilized in a distributed network, such as the network 108 of FIG. 1, to implement multiple components in a transaction-based environment. An object or service oriented architecture may be used to implement such functions and communicate between the multiple systems and components. One example computing device in the form of a computer 610 may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a computer-readable medium. For example, a computer program 625 capable of providing a technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 610 to provide access controls in various environments, including environments having multiple users and servers A further embodiment in the form of a computing device includes a bus with a processor and memory coupled thereto. This embodiment further includes a file management policy module stored in the memory and executable by the processor to receive a file management request affecting a location where a first file is stored and to query a repository of file management rules as a function of at least one of a file type of the first file, a location where the first file is stored, a destination of where the first file is to be stored, and an identity of a user of the system. The file management policy module is further executable by the processor to determine if the first file may be stored at the destination as a function of the query results and to prevent the file management function when the determining identifies that the first file may not be stored at the destination. Determining a file may not be stored at the destination may be made based on several factors embodied in a file management rule. For example, a requesting user may not be authorized to copy files from a particular source or to a particular destination. Other file management rules may be defined to prevent storage operations affecting locations where files of particular types may be stored. Other file management rules may be created based on any number of factors that may be identified by evaluating properties of files, original storage locations and destination storage locations, device types files are to be stored to, and data of or associated with a logical or human user requesting a particular file management function.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computerized method comprising:
based on detection of a request from a client to perform a file management function on a first file stored in a first storage device associated with a file server, determining content of the first file, wherein the client is authorized to access the first file and the file management function comprises a write function with a destination that is a different storage device than the first storage device;
querying a repository of file management rules based on determined content of the first file and the destination to determine whether the file management function can be performed;
based on a determination that the first file includes a second file embedded therein, determining content of the second file;
querying the repository of file management rules based on determined content of the second file and the destination to determine whether the file management function to the destination can be performed on the second file;
based on a determination that at least one of the file management rules indicates that the file management function to the destination is not permitted for the first file, preventing the file management function; and
based on a determination that at least one of the file management rules indicates that the file management function to the destination is permitted for the second file, allowing the file management function to be performed on the second file to the destination while preventing the file management function from being performed on the first file to the destination.

2. The computerized method of claim 1, further comprising:
logging the file management function request including an indication if the file management function was allowed or prevented and data identifying a user.

3. The computerized method of claim 1, further comprising:
communicating an alert to another user when a file management function is prevented.

4. The computerized method of claim 1, wherein the first file is a compressed file including at least the second file compressed therein.

5. The computerized method of claim 1, wherein the file management function comprises a "save as" function, a copy function, or a move function.

6. The computerized method of claim 1, wherein determining content of the first file comprises:
determining the file type of the first file.

7. The computerized method of claim 1, wherein determining the content of the first file comprises:
evaluating a portion of the first file, wherein the portion comprises at least one of a header of the first file, trailer data of the first file, content data of the first file, and structure of the first file;
evaluating an extension of the first file; and
determining whether the evaluated portion of the first file conforms to a file format definition corresponding to the extension.

8. A system comprising:
a bus;
a processor coupled to the bus;
a computer-readable medium comprising instructions executable by the processor to cause the system to:
based on detection of a file management request to perform a write function on a first file to a destination indicated in the file management request determine content of the first file, wherein the first file is stored on a first data storage device associated with the system and the destination is different than the first data storage device;
query a repository of file management rules based, at least in part, on determined content of the first file and the destination to determine whether the write function can be performed;
based on a determination that the first file includes a second file embedded therein, determine content of the second file;
query the repository of file management rules based on the determined content of the second file and the destination to determine whether the write function to the destination can be performed on the second file;
based on a determination that at least one of the file management rules indicates that the write function to the destination is not permitted for the first file, prevent the write function from being performed on the first file to the destination; and
based on a determination that at least one of the file management rules indicates that the write function to the destination is permitted for the second fife but not permitted for the first file, allow the write function to be performed on the second file to the destination and prevent the write function from being performed on the first file to the destination.

9. The system of claim 8, wherein the file type of the first file is a folder including at least the second file stored therein.

10. One or more non-transitory computer-readable media comprising program instructions for content based control of file distribution, the program instructions to:
based on detection of a request to perform a write function on a first file to a destination indicated in the file management request, determine content of the first file, wherein the first file is stored on a first data storage device associated with a file server and the destination is different than the first data storage device;
query a repository of file management rules based, at least in part, on determined content of the first file and the destination to determine whether the write function can be performed; and
based on a determination that the first file includes a second file embedded within the first file, determine content of the second file;
query the repository of file management rules based on the determined content of the second file and the destination to determine whether the write function to the destination can be performed on the second file;
based on determination that at least one of the file management rules indicates that the write function to the destination is not permitted for the first file, prevent the write function from being performed on the first file to the destination; and
based on a determination that at least one of the file management rules indicates that the write function to the destination is permitted for the second file but not permitted for the first file, allow the write function to be performed on the second file to the destination and prevent the write function from being performed on the first file to the destination.

11. The non-transitory computer-readable media of claim 10 further comprise program instruction to determine whether a request corresponding to the request is authorized to access the first file, wherein the program instructions to prevent the write function comprise the program instructions to prevent the write function despite the requester being authorized to access the first file.

12. The non-transitory computer-readable media of claim 10 comprising at least one of an operating system and a device driver, at least one of which comprises the program instructions.

13. The method of claim 1, wherein determination of the content of the first file is after a determination that the client is authorized to access the first file.

14. The method of claim 13 further comprising:
presenting the first file at the client after the determination that the client is authorized to access the first file;
wherein a device driver or an operating system of the client performs the querying after the first file is presented at the client.

* * * * *